(12) United States Patent
Graham

(10) Patent No.: X7059
(45) Date of Patent: May 15, 1832

(54) HATS, BODIES,FORMING

(76) Inventor: Seth Graham

Seth Graham

Letters Patent [illegible]

The Schedule referred to in these Letters Patent and making part of the same containing a description in the words of the said Seth Graham himself of his improvement in the machine for forming Hat Bodies.

This machine is stationed in the rear of a carding machine and is intimately connected with it both in its construction and operation
The wool is discharged from a cylinder of the carding machine called the doffer, in a thin web which passes under the [illegible] of a wire which extends from one side of the carding machine to the other in a curved form.
The web is formed into hats bodies by the operation of two conical blocks that lay in a horizontal position and in their operation receive three different motions. These conical blocks which are seventeen inches in length are so placed that the two larger Bases come in close contact with each other. the diameter of the large base being fourteen and half inches, and the diameter of the smaller base seven inches and one fourth. The small ends being globated. The blocks are placed on two pairs of cone rollers which are twenty one and a half inches in length. seven inches diameter at the larger end three inches and a half at the smaller ends – The small ends of these also are globated. The cone rollers and also the blocks, are made hollow: and thro the centre of the rollers are small iron shafts the ends of which project out sufficient length for gudgeons. The rollers revolve inward towards the carding machine and in their operation they give motion to the blocks – The blocks and rollers together with their appendages, have two vibrating motions. the first is from right to left alternately and is effected by a piece of the machine called the vibrating floor. This floor is a piece of plank of pine or other suitable kind of wood about forty inches in length and twenty two inches in width. and its form is nearly that of an open fan cut off at the place where the stocks unite with the spread substituting for the part expunged a
stem that is sixty four inches in length and three by two inches square
at the outward end of which and about two inches from the end is a
perforation half an inch diameter which works on a pivot that is con
fined to the floor of the machine building.
The vibrating floor works on a curved railway of sufficient length to ac
commodate the extent of the motion or vibration — The railway is com
posed of a curved piece of board about three inches in width and one inch
thick confined to the floor of the machine building by any proper fas
tenings with the concave edge towards the carding machine. a
piece of iron plate one inch in width and three sixteenths of an
inch thick is firmly fixed to the convex edge of the curve piece of
board. the length of the plate corresponding to the length of the board
and the edge of the plate projecting above the surface of the board half
an inch. on this projection two friction Rollers travel which work
in suitable mortices made in the vibrating floor. These friction
Rollers are three and half inches diameter and half an inch thick
with grooves adapted to work on the projection of the railway. the
distance from the friction Rollers to the outward edge of the floor
is five inches and a half and the space between the rollers is twen
ty six inches and three fourths. The second vibrating motion
is effected by another piece of the machine. which is a piece of board
in the form of a diamond. four feet in length from one point to the
other (the points being rounded a little) and eighteen inches in
width called the upper vibrating floor. and the space occupied
between the floors is about two inches — The upper floor is sup
ported by a piece of iron plate in the form of an arch which stands
upon the lower floor directly over the centre line and two inches from
the front side. this arch is confined in its place by screw fastenings
A perforation half inch diameter is made through the upper
floor. on the centre line at a distance of two inches and a half
from the front side and an iron bolt passes thro' this and a correspon
ding perforation made in the top of the iron arch, on which the floor works the floor moves upon this bolt as upon a pivot. To facilitate the vi-
bration of this floor a curve railway is fixed on the under surface
of the floor with the concave side towards the pivot on which the floor
turns. This railway may be of cast iron or other hard metal is twen-
ty inches in length one inch and a half in width, and half an
thick with a projection rising on the convex side one fourth of an
inch. This railway is fitted to operate in grooves made in the cir-
cumference of the friction Rollers that are two inches and a half in
diameter and half an inch thick. These friction rollers work in mor-
tises made in the lower floor, on a sweep of eleven inches and three
eighths from the centre of the motion to the centre of the grooves in
the rollers. — All the friction rollers may be made of cast iron or other
hard metal — The mortises in which the larger friction rollers work
are covered with wooden caps which are about four inches long two
inches wide and one inch thick. To prevent the upper railway from
being interrupted in its motions by the cap pieces small grooves are
made in the upper surface, corresponding to the size and motion
of the railway — The distance from the centre line on the lower
floor to the centre of the grooves in the last mentioned friction
rollers respectively is four inches and three fourths.

An arch is erected on the upper floor (the feet of which stand on a centre
line drawn lengthwise of the floor. This arch is a curve piece of iron
that is an inch and a half in width and half an inch thick. The
distance from the floor to the top of the arch is seven inches, and the
space occupied between the feet of the arch is about twelve inches.
the feet which stand outward two inches are confined to the floor by
screws which pass thro' perforations made in them.

The bearings which sustain the large ends of the cone rollers consists
of two pieces of iron each of which is ten inches in length, one inch
in width and half an inch in thickness. in one end of these
pieces is an oblong aperture two inches in length and half an inch in
width. These ends are placed one upon another so that they over
lap each other three inches and being thus united they are placed transversely across the top of the above described arch and confined in
that position by a screw bolt that is half an inch square and passes
thro a corresponding perforation made in the top of the arch precise-
ly in the centre with a nut on the upper end of the screw bolt.
The outward ends are elevated in a curved form about four inches and
semicircular sockets formed in them adapted to receive and sustain
the gudgeon on the large end of the cone rollers.
The bearings which support the small ends of the cone rollers are
two plates of iron that are one inch in width and half an inch in
thickness - These plates of iron are turned in the form of a right
angled triangle the perpendicular part being twelve inches in height
and the hypothenuse which answers the purpose of a brace is fifteen
inches in length. Three inches of the lower end of the perpendicular
(exclusive of the height) and also the brace turned up. which turns
serve as feet to rest on the floor. where they are confined by screws
that pass thro the feet into the floor at the centre line
The space between the upper ends of the perpendicular parts corresponds
to the entire length of the cone rollers. In the upper ends of the per-
pendicular part of the triangular pieces at about two inches from
the top are perforations half inch diameter in which are iron screw
bolts with nuts on the outward ends. These bolts and nuts are fitted
to receive and confine two pieces of iron plate which are six inches
long one inch wide and five eighths of an inch thick with apertures
or mortises made thro them. four inches in length and half an inch
in width. These pieces are attached to the perpendicular parts of the
triangular pieces and confined in their places by the iron bolts at the
top. By sliding these pieces upward or downward their height
is adapted to the proper position of the cone rollers. On the top of
these sliding pieces is a piece of iron plate four inches long with
semicircular sockets in the ends fitted to receive and sustain the
gudgeons on the small ends of the cone rollers. On the large ends of
the two cone rollers which lay towards the carding machine. are the
bevied wheels of cast iron or other hard metal, whose diameters are [illegible]

inches and a half and a row of cogs constructed on the bevled surface
of each of these wheels interlock each other. on the large end of the left
hand cone roller which lies in front is a circular piece of iron or tin
plate the diameter of which is seven inches giving a projection of one fourth
of an inch from the surface of the roller. and this projected part of the
plate works in the seam between the large ends of the blocks.
A small beveled wheel three inches and one fourth diameter. the cogs
of which interlock with the cogs on the right hand of the two above
described wheels. works horizontally on a small iron shaft that is
three inches in length and stands in a vertical position directly under
the gudgeons on the cone rollers. The gudgeon on the upper end of this
shaft works in a perforation made in, and near the end of a piece
of iron plate that is nine inches in length. one inch in width and
one fourth of an inch thick. the inward end of which passes under
the arch piece with a perforation made in it fitted to receive the iron
bolt at the top of the arch by which bolt this end is confined. In the
middle it is confined to the iron which lays above by [illegible]
that pass thro both pieces. The gudgeon on the lower end of this shaft
works in a similar piece of iron secured by similar fastenings at
the inner ends. Under the bevel wheel and on the same shaft is a wood
en pulley three inches diameter and one and a half thick. on the
opposite side of. and nearly equal distance from the arch is another
small iron shaft six inches in length in a vertical position. near
the upper end of which is a pulley three and a half inches diameter
and one inch and a half thick. This pulley is connected with the
one on the other shaft by a suitable band. Near the lower end of the
shaft is another wooden pulley three inches diameter. and two inch
es in thickness. The gudgeon on the lower end of this shaft works
in a socket that is confined to the upper vibrating floor and the
gudgeon on the other end works in a perforation made in a piece
of iron plate that is ten inches long. one inch and one fourth in
width and one fourth of an inch thick. the other end being confined
to the arch by the bolt that passes through arch piece at the top. The cone rollers receive motion from the doffer thro' the medium of a series
of pulleys bands and wheels as follows viz. A pulley ten inches diam
eter is fitted on the left end of the doffer inside of the pulley that belongs
to the doffer. and this pulley is connected with another nearly under
it. the shaft of which extends across the whole width of the carding ma-
chine. the gudgeons of this shaft being supported by suitable bearings
that are confined on the upper surface of the side rails. On the other end
of this shaft, and inside of the opposite side rail is another pulley or
cylinder of a length suited to present three plain surfaces of differ
ent diameters which are of sufficient width to receive a suitable
band. the smallest diameter is six inches and lays towards the
opposite side of the machine - the larger diameter is seven inches -
and the largest is eight inches. This cylinder is connected by a
band with another of like construction. the shaft of which extends across
the width of the carding machine at a small distance from the out
ward end of the stem of the lower floor and the gudgeons of this shaft are
confined to the inside of the side rails. The smallest diameter of the last
mentioned cylinder is placed in a direction opposite to that with which
it is connected. the several surfaces of different diameters presented
on the periphery of these two cylinders are designed to vary the speed
of the cone rollers by moving the band that connects them from larger
to smaller and vice versa — On the middle of the shaft on
which the last mentioned pulley works is a spur wheel six inches
diameter which interlocks with another of like form and dimensions
and the mesh of these two wheels must be directly over the pivot on
which the vibrating stem operates. A pulley two inches thick and
six inches diameter is placed on the shaft of the last mentioned
spur wheel and comes in close contact with the left side of it. The
shaft of this wheel and pulley is four inches in length and the gudg-
eons work in perforations made in suitable pieces of iron plate that
are confined to the sides of the vibrating stems. The last described
pulley is connected by a band with the pulley on the lower end of
the vertical shaft stationed on the front of the upper vibrating
floor.

and the pulley on the upper end of this shaft being connected with the pul
ley on the opposite side of the arch as before described completes the series of
pulleys which communicate motion from the doffer to the concave roller.
The lower vibrating floor receives motion from a cylinder of the carding ma
chine called the feeder through the medium of a series of pulleys. The
first of which is a pulley five inches diameter that works on the shaf
of the feeder pinion. This pulley is connected by a band with another
which works directly under it, and is eight inches diameter. The shaft
of this pulley is supported by iron bearings, one of which is confined
to the side rail of the carding machine, and the other is confined to the
floor of the machine building On the same shaft and inside of the
pulley last described is another pulley which is three inches diame
ter and is connected by a band with another twelve inches diame
ter that works in a horizontal position outside of the carding ma
chine about twenty four inches forward of the rear post. grooves
are made in the circumference of these two pulleys fitted to receive the
band that operates on them. The horizontal wheel is connected
with the vibrating stem by an iron rod or arm with perforations
made in it near each end. The perforation in one end works on a
pivot inserted in the vibrating stem at the post directly opposite to
the centre of the horizontal wheel and the perforation in the other end
of the arm works on a moveable pivot which is placed on the upper
surface of the horizontal wheel at about two inches from the circumference
The moveable quality of the pivot on the wheel is designed to vary the ex
tent of vibration so as to correspond with the size of the blocks that are
used whether they be larger or smaller. By the operation of the horizontal
wheel upon the vibrating stem the lower floor and its dependents are moved
alternately from right to left — The second vibrating motion of the
upper floor is effected by means of two cords which pass around a pulley
three inches diameter that works horizontally on the vibrating stem
at a distance of six inches from the floor One end of each cord is attach
ed to the ends of the upper floor, and passing round the pulley to the same
side of the carding machine is there confined as the upper floor moves obliquely to the right or left the cord on the opposite end prevents it from
making a circuitous motion like the other floor and consequently the cone
rollers and blocks are kept in a position parallel to the cylinder from which
the web of wool is discharged.
The specific size of the parts of this machine as they are stated in this
specification are such as are found to be convenient but they may be varied
without injuring the general construction of the machine. To work the
machine above described the attendance of two workmen is necessary.
one to feed the carding machines, and the other to tend the cone blocks.
The workman receives the web as it is discharged from the doffer and applies
the end to the blocks which form it into two hat bodies that are sepa
rated by cutting with a pair of shears. between the large ends of the blocks
and while the web is winding round one block the hat body is removed
from the other and the block returned to its place in season to receive
the web in its return — The machine above described. I claim
as the first and sole inventor Exd. Witnesses
W.C. [illegible] O. F. Deane
Henry Craig Seth Graham

[illegible]